United States Patent
Manasse

(10) Patent No.: US 10,460,203 B2
(45) Date of Patent: Oct. 29, 2019

(54) JACCARD SIMILARITY ESTIMATION OF WEIGHTED SAMPLES: SCALING AND RANDOMIZED ROUNDING SAMPLE SELECTION WITH CIRCULAR SMEARING

(71) Applicant: salesforce.com, inc., San Francisco, CA (US)

(72) Inventor: Mark Manasse, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 538 days.

(21) Appl. No.: 15/339,796

(22) Filed: Oct. 31, 2016

(65) Prior Publication Data
US 2018/0121820 A1    May 3, 2018

(51) Int. Cl.
*G06K 9/62* (2006.01)
(52) U.S. Cl.
CPC ......... *G06K 9/6215* (2013.01); *G06K 9/6212* (2013.01)
(58) Field of Classification Search
CPC .......................... G06K 9/6212; G06K 9/6215
See application file for complete search history.

(56) References Cited

PUBLICATIONS

Haeupler, Bernhard, Mark Manasse, and Kunal Talwar. "Consistent weighted sampling made fast, small, and easy." arXiv preprint arXiv:1410.4266 (2014). (Year: 2014).*
Shrivastava, Anshumali, and Ping Li. "Improved densification of one permutation hashing." arXiv preprint arXiv:1406.4784(2014). (Year: 2014).*
Manasse, "On the Efficient Determination of Most Near Neighbors", 2d Ed, 2015, 104 pages.

* cited by examiner

*Primary Examiner* — Miranda M Huang
*Assistant Examiner* — Margaret R Zhang
(74) *Attorney, Agent, or Firm* — Holland & Hart LLP

(57) ABSTRACT

The disclosed systems and methods include pre-calculation, per object, of object feature bin values, for identifying close matches between objects, such as text documents, that have numerous weighted features, such as specific-length word sequences. Predetermined feature weights get scaled with two or more selected adjacent scaling factors, and randomly rounded. The expanded set of weighted features of an object gets min-hashed into a predetermined number of feature bins. For each feature that qualifies to be inserted by min-hashing into a particular feature bin, and across successive feature bins, the expanded set of weighted features get min-hashed and circularly smeared into the predetermined number of feature bins. Completed pre-calculated sets of feature bin values for each scaling of the object, together with the scaling factor, are stored for use in comparing sampled features of the object with sampled features of other objects by calculating an estimated Jaccard similarity index.

25 Claims, 9 Drawing Sheets

| Feature Number 310 | Feature Values 311 | Feature Weights 312 | Feature Weights Scaled by 8 313 | Feature Weights Scaled by 16 314 | Feature Weights Scaled by 32 315 | Random Rounding Threshold 316 | Feature Weights Scaled by 8 & Rounded 317 | Feature Weights Scaled by 16 & Rounded 318 | Feature Weights Scaled by 32 & Rounded 319 |
|---|---|---|---|---|---|---|---|---|---|
| 1 | 406 | 1.4 | 11.1 | 22.2 | 44.5 | 0.2301 | 11 | 23 | 45 |
| 2 | 311 | 1.2 | 9.8 | 19.2 | 38.4 | 0.1484 | 10 | 20 | 39 |
| 3 | 848 | 1.4 | 11.3 | 22.6 | 45.1 | 0.5131 | 11 | 23 | 45 |
| 4 | 243 | 1.7 | 13.4 | 26.7 | 53.4 | 0.5821 | 13 | 27 | 53 |
| 5 | 335 | 0.4 | 3.0 | 5.9 | 11.8 | 0.4478 | 3 | 6 | 12 |
| 6 | 647 | 0.3 | 2.2 | 4.3 | 8.6 | 0.1943 | 2 | 5 | 9 |
| 7 | 381 | 0.1 | 0.7 | 1.4 | 2.9 | 0.1551 | 1 | 2 | 3 |
| 8 | 192 | 1.8 | 14.3 | 28.6 | 57.3 | 0.7371 | 14 | 28 | 57 |
| 9 | 907 | 0.4 | 3.0 | 6.1 | 12.2 | 0.9445 | 3 | 6 | 12 |
| 10 | 222 | 1.6 | 12.6 | 25.1 | 50.2 | 0.1459 | 13 | 25 | 51 |
| 11 | 638 | 1.2 | 9.4 | 18.7 | 37.4 | 0.5583 | 9 | 19 | 37 |
| 12 | 103 | 1.8 | 14.6 | 29.3 | 58.6 | 0.0698 | 14 | 29 | 58 |
| 13 | 209 | 1.5 | 12.2 | 24.5 | 49.0 | 0.2432 | 12 | 25 | 49 |
| 14 | 290 | 0.9 | 7.3 | 14.6 | 29.1 | 0.4315 | 7 | 15 | 29 |
| 15 | 59 | 0.8 | 6.7 | 13.4 | 26.9 | 0.5401 | 7 | 13 | 27 |
| 16 | 708 | 0.9 | 7.0 | 13.9 | 27.8 | 0.3501 | 7 | 14 | 28 |
| 17 | 381 | 0.0 | 0.3 | 0.6 | 1.3 | 0.6733 | 0 | 0 | 1 |
| 18 | 503 | 1.8 | 14.3 | 28.6 | 57.3 | 0.0966 | 14 | 28 | 57 |
| 19 | 461 | 0.8 | 6.2 | 12.3 | 24.6 | 0.0923 | 7 | 13 | 25 |

Fig. 3

| Sample 1 expanded | Expanded To 11 Values | Hashed Feature Values | Expanded To 23 Values | Hashed Feature Values | Expanded To 45 Values | Hashed Feature Values |
|---|---|---|---|---|---|---|
| 1 | 406,1 | 56.2624 | 406,1 | 56.2624 | 406,1 | 56.2624 |
| 2 | 406,2 | 0.1794 | 406,2 | 0.1794 | 406,2 | 0.1794 |
| 3 | 406,3 | 61.8984 | 406,3 | 61.8984 | 406,3 | 61.8984 |
| 4 | 406,4 | 121.2611 | 406,4 | 121.2611 | 406,4 | 121.2611 |
| 5 | 406,5 | 87.2649 | 406,5 | 87.2649 | 406,5 | 87.2649 |
| 6 | 406,6 | 59.4106 | 406,6 | 59.4106 | 406,6 | 59.4106 |
| 7 | 406,7 | 18.5489 | 406,7 | 18.5489 | 406,7 | 18.5489 |
| 8 | 406,8 | 30.9592 | 406,8 | 30.9592 | 406,8 | 30.9592 |
| 9 | 406,9 | 26.6526 | 406,9 | 26.6526 | 406,9 | 26.6526 |
| 10 | 406,10 | 115.4592 | 406,10 | 115.4592 | 406,10 | 115.4592 |
| 11 | 406,11 | 61.5576 | 406,11 | 61.5576 | 406,11 | 61.5576 |
| 12 | | | 406,12 | 117.8377 | 406,12 | 117.8377 |
| 13 | | | 406,13 | 53.3967 | 406,13 | 53.3967 |
| 14 | | | 406,14 | 112.9116 | 406,14 | 112.9116 |
| 15 | | | 406,15 | 125.2004 | 406,15 | 125.2004 |
| 16 | | | 406,16 | 119.0577 | 406,16 | 119.0577 |
| 17 | | | 406,17 | 71.8245 | 406,17 | 71.8245 |
| 18 | | | 406,18 | 1.7144 | 406,18 | 1.7144 |
| 19 | | | 406,19 | 72.3577 | 406,19 | 72.3577 |
| 20 | | | 406,20 | 15.9067 | 406,20 | 15.9067 |
| 21 | | | 406,21 | 20.2526 | 406,21 | 20.2526 |
| 22 | | | 406,22 | 63.1069 | 406,22 | 63.1069 |
| 23 | | | 406,23 | 98.6861 | 406,23 | 98.6861 |
| 24 | | | | | 406,24 | 8.0536 |
| 25 | | | | | 406,25 | 35.9137 |
| 26 | | | | | 406,26 | 13.8930 |
| 27 | | | | | 406,27 | 34.0764 |
| 28 | | | | | 406,28 | 25.7686 |
| 29 | | | | | 406,29 | 35.1803 |
| 30 | | | | | 406,30 | 91.0371 |
| 31 | | | | | 406,31 | 55.5426 |
| 32 | | | | | 406,32 | 80.5597 |
| 33 | | | | | 406,33 | 118.1291 |
| 34 | | | | | 406,34 | 50.5051 |
| 35 | | | | | 406,35 | 121.3993 |
| 36 | | | | | 406,36 | 50.0386 |
| 37 | | | | | 406,37 | 64.2706 |
| 38 | | | | | 406,38 | 100.3422 |
| 39 | | | | | 406,39 | 80.9719 |
| 40 | | | | | 406,40 | 56.0145 |
| 41 | | | | | 406,41 | 124.3754 |
| 42 | | | | | 406,42 | 35.2038 |
| 43 | | | | | 406,43 | 122.5829 |
| 44 | | | | | 406,44 | 81.5354 |
| 45 | | | | | 406,45 | 90.1708 |

FIG. 4

| Bin Number | Smearing feature 406,1 | Smearing feature 406,2 | Smearing feature 406,3 | Bin Number | Smearing feature 406,1 | Smearing feature 406,2 | Smearing feature 406,3 |
|---|---|---|---|---|---|---|---|
| 0 | 72.2624 | 0.1794 | | 36 | 108.2624 | 36.1794 | |
| 1 | 73.2624 | 1.1794 | | 37 | 109.2624 | 37.1794 | |
| 2 | 74.2624 | 2.1794 | | 38 | 110.2624 | 38.1794 | |
| 3 | 75.2624 | 3.1794 | | 39 | 111.2624 | 39.1794 | |
| 4 | 76.2624 | 4.1794 | | 40 | 112.2624 | 40.1794 | |
| 5 | 77.2624 | 5.1794 | | 41 | 113.2624 | 41.1794 | |
| 6 | 78.2624 | 6.1794 | | 42 | 114.2624 | 42.1794 | |
| 7 | 79.2624 | 7.1794 | | 43 | 115.2624 | 43.1794 | |
| 8 | 80.2624 | 8.1794 | | 44 | 116.2624 | 44.1794 | |
| 9 | 81.2624 | 9.1794 | | 45 | 117.2624 | 45.1794 | |
| 10 | 82.2624 | 10.1794 | | 46 | 118.2624 | 46.1794 | |
| 11 | 83.2624 | 11.1794 | | 47 | 119.2624 | 47.1794 | |
| 12 | 84.2624 | 12.1794 | | 48 | 120.2624 | 48.1794 | |
| 13 | 85.2624 | 13.1794 | | 49 | 121.2624 | 49.1794 | |
| 14 | 86.2624 | 14.1794 | | 50 | 122.2624 | 50.1794 | |
| 15 | 87.2624 | 15.1794 | | 51 | 123.2624 | 51.1794 | |
| 16 | 88.2624 | 16.1794 | | 52 | 124.2624 | 52.1794 | |
| 17 | 89.2624 | 17.1794 | | 53 | 125.2624 | 53.1794 | |
| 18 | 90.2624 | 18.1794 | | 54 | 126.2624 | 54.1794 | |
| 19 | 91.2624 | 19.1794 | | 55 | 127.2624 | 55.1794 | |
| 20 | 92.2624 | 20.1794 | | 56 | 0.2624 | | |
| 21 | 93.2624 | 21.1794 | | 57 | 1.2624 | | |
| 22 | 94.2624 | 22.1794 | | 58 | 2.2624 | | |
| 23 | 95.2624 | 23.1794 | | 59 | 3.2624 | | |
| 24 | 96.2624 | 24.1794 | | 60 | 4.2624 | | |
| 25 | 97.2624 | 25.1794 | | 61 | 5.2624 | | 0.8984 |
| 26 | 98.2624 | 26.1794 | | 62 | 6.2624 | | 1.8984 |
| 27 | 99.2624 | 27.1794 | | 63 | 7.2624 | | 2.8984 |
| 28 | 100.2624 | 28.1794 | | 64 | 8.2624 | | 3.8984 |
| 29 | 101.2624 | 29.1794 | | 65 | 9.2624 | | 4.8984 |
| 30 | 102.2624 | 30.1794 | | 66 | 10.2624 | | 5.8984 |
| 31 | 103.2624 | 31.1794 | | 67 | 11.2624 | | 6.8984 |
| 32 | 104.2624 | 32.1794 | | 68 | 12.2624 | | 7.8984 |
| 33 | 105.2624 | 33.1794 | | 69 | 13.2624 | | 8.8984 |
| 34 | 106.2624 | 34.1794 | | 70 | 14.2624 | | 9.8984 |
| 35 | 107.2624 | 35.1794 | | 71 | 15.2624 | | 10.8984 |
| 36 | 108.2624 | 36.1794 | | 72 | 16.2624 | | 11.8984 |
| 37 | 109.2624 | 37.1794 | | 73 | 17.2624 | | 12.8984 |

| Bin Number | Smearing feature 406,1 | Smearing feature 406,2 | Smearing feature 406,3 | Smearing feature 406,4 | Bin Number | Smearing feature 406,1 | Smearing feature 406,2 | Smearing feature 406,3 | Smearing feature 406,4 |
|---|---|---|---|---|---|---|---|---|---|
| 76 | 20.2624 | | 15.8984 | | 103 | 47.2624 | | 42.8984 | |
| 77 | 21.2624 | | 16.8984 | | 104 | 48.2624 | | 43.8984 | |
| 78 | 22.2624 | | 17.8984 | | 105 | 49.2624 | | 44.8984 | |
| 79 | 23.2624 | | 18.8984 | | 106 | 50.2624 | | 45.8984 | |
| 80 | 24.2624 | | 19.8984 | | 107 | 51.2624 | | 46.8984 | |
| 81 | 25.2624 | | 20.8984 | | 108 | 52.2624 | | 47.8984 | |
| 82 | 26.2624 | | 21.8984 | | 109 | 53.2624 | | 48.8984 | |
| 83 | 27.2624 | | 22.8984 | | 110 | 54.2624 | | 49.8984 | |
| 84 | 28.2624 | | 23.8984 | | 111 | 55.2624 | | 50.8984 | |
| 85 | 29.2624 | | 24.8984 | | 112 | 56.2624 | | 51.8984 | |
| 86 | 30.2624 | | 25.8984 | | 113 | 57.2624 | | 52.8984 | |
| 87 | 31.2624 | | 26.8984 | | 114 | 58.2624 | | 53.8984 | |
| 88 | 32.2624 | | 27.8984 | | 115 | 59.2624 | | 54.8984 | |
| 89 | 33.2624 | | 28.8984 | | 116 | 60.2624 | | 55.8984 | |
| 90 | 34.2624 | | 29.8984 | | 117 | 61.2624 | | 56.8984 | |
| 91 | 35.2624 | | 30.8984 | | 118 | 62.2624 | | 57.8984 | |
| 92 | 36.2624 | | 31.8984 | | 119 | 63.2624 | | 58.8984 | |
| 93 | 37.2624 | | 32.8984 | | 120 | 64.2624 | | 59.8984 | |
| 94 | 38.2624 | | 33.8984 | | 121 | 65.2624 | | 60.8984 | 0.2611 |
| 95 | 39.2624 | | 34.8984 | | 122 | 66.2624 | | 61.8984 | 1.2611 |
| 96 | 40.2624 | | 35.8984 | | 123 | 67.2624 | | 62.8984 | 2.2611 |
| 97 | 41.2624 | | 36.8984 | | 124 | 68.2624 | | 63.8984 | 3.2611 |
| 98 | 42.2624 | | 37.8984 | | 125 | 69.2624 | | 64.8984 | 4.2611 |
| 99 | 43.2624 | | 38.8984 | | 126 | 70.2624 | | 65.8984 | 5.2611 |
| 100 | 44.2624 | | 39.8984 | | 127 | 71.2624 | | 66.8984 | 6.2611 |
| 101 | 45.2624 | | 40.8984 | | | | | | |
| 102 | 46.2624 | | 41.8984 | | | | | | |

FIG. 6

| Bin Number | Values in Bins After Smearing Four Feature Values | Bin Number | Values in Bins After Smearing Four Feature Values | Bin Number | Values in Bins After Smearing Four Feature Values |
|---|---|---|---|---|---|
| 0 | 0.1794 | 43 | 43.1794 | 85 | 24.8984 |
| 1 | 1.1794 | 44 | 44.1794 | 86 | 25.8984 |
| 2 | 2.1794 | 45 | 45.1794 | 87 | 26.8984 |
| 3 | 3.1794 | 46 | 46.1794 | 88 | 27.8984 |
| 4 | 4.1794 | 47 | 47.1794 | 89 | 28.8984 |
| 5 | 5.1794 | 48 | 48.1794 | 90 | 29.8984 |
| 6 | 6.1794 | 49 | 49.1794 | 91 | 30.8984 |
| 7 | 7.1794 | 50 | 50.1794 | 92 | 31.8984 |
| 8 | 8.1794 | 51 | 51.1794 | 93 | 32.8984 |
| 9 | 9.1794 | 52 | 52.1794 | 94 | 33.8984 |
| 10 | 10.1794 | 53 | 53.1794 | 95 | 34.8984 |
| 11 | 11.1794 | 54 | 54.1794 | 96 | 35.8984 |
| 12 | 12.1794 | 55 | 55.1794 | 97 | 36.8984 |
| 13 | 13.1794 | 56 | 0.2624 | 98 | 37.8984 |
| 14 | 14.1794 | 57 | 1.2624 | 99 | 38.8984 |
| 15 | 15.1794 | 58 | 2.2624 | 100 | 39.8984 |
| 16 | 16.1794 | 59 | 3.2624 | 101 | 40.8984 |
| 17 | 17.1794 | 60 | 4.2624 | 102 | 41.8984 |
| 18 | 18.1794 | 61 | 0.8984 | 103 | 42.8984 |
| 19 | 19.1794 | 62 | 1.8984 | 104 | 43.8984 |
| 20 | 20.1794 | 63 | 2.8984 | 105 | 44.8984 |
| 21 | 21.1794 | 64 | 3.8984 | 106 | 45.8984 |
| 22 | 22.1794 | 65 | 4.8984 | 107 | 46.8984 |
| 23 | 23.1794 | 66 | 5.8984 | 108 | 47.8984 |
| 24 | 24.1794 | 67 | 6.8984 | 109 | 48.8984 |
| 25 | 25.1794 | 68 | 7.8984 | 110 | 49.8984 |
| 26 | 26.1794 | 69 | 8.8984 | 111 | 50.8984 |
| 27 | 27.1794 | 70 | 9.8984 | 112 | 51.8984 |
| 28 | 28.1794 | 71 | 10.8984 | 113 | 52.8984 |
| 29 | 29.1794 | 72 | 11.8984 | 114 | 53.8984 |
| 30 | 30.1794 | 73 | 12.8984 | 115 | 54.8984 |
| 31 | 31.1794 | 74 | 13.8984 | 116 | 55.8984 |
| 32 | 32.1794 | 75 | 14.8984 | 117 | 56.8984 |
| 33 | 33.1794 | 76 | 15.8984 | 118 | 57.8984 |
| 34 | 34.1794 | 77 | 16.8984 | 119 | 58.8984 |
| 35 | 35.1794 | 78 | 17.8984 | 120 | 59.8984 |
| 36 | 36.1794 | 79 | 18.8984 | 121 | 0.2611 |
| 37 | 37.1794 | 80 | 19.8984 | 122 | 1.2611 |
| 38 | 38.1794 | 81 | 20.8984 | 123 | 2.2611 |
| 39 | 39.1794 | 82 | 21.8984 | 124 | 3.2611 |
| 40 | 40.1794 | 83 | 22.8984 | 125 | 4.2611 |
| 41 | 41.1794 | 84 | 23.8984 | 126 | 5.2611 |
| 42 | 42.1794 | | | 127 | 6.2611 |

FIG. 7

JACCARD SIMILARITY ESTIMATION OF WEIGHTED SAMPLES: SCALING AND RANDOMIZED ROUNDING SAMPLE SELECTION WITH CIRCULAR SMEARING

RELATED APPLICATION

This application is related to U.S. patent application Ser. No. 15/339,793 to Mark Manasse, entitled "JACCARD SIMILARITY ESTIMATION OF WEIGHTED SAMPLES: CIRCULAR SMEARING WITH SCALING AND RANDOMIZED ROUNDINGS SAMPLE SELECTION" filed concurrently. The related application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

It is straightforward, if often computationally intensive in aggregate, to determine when two objects are identical, but it is far more useful to determine when two objects are similar. A primary cost is the pairwise comparisons, leading to a quadratic explosion in the work to compare a corpus of documents. For example, approximately one third of all web pages have look-alike pages that are nearly identical to the identified page, albeit with disparate legal boilerplate, header and footer details, such as dates and organization titles and pagination. It becomes useful and economically advantageous to assess similarity between objects, with sampling techniques and comparisons; for example, for deduplication of files and for plagiarism detection. In other applications, such as entity resolution, the goal is to find people with missing or added middle initials or names in otherwise matching data sets.

Computing approximate file similarity in very large files is a common task with many data management and information retrieval applications.

SUMMARY

A simplified summary is provided herein to help enable a basic or general understanding of various aspects of exemplary, non-limiting implementations that follow in the more detailed description and the accompanying drawings. This summary is not intended as an extensive or exhaustive overview. Instead, the sole purpose of this summary is to present concepts related to some exemplary non-limiting implementations, in a simplified form, as a prelude to the more detailed description of the various implementations that follow.

The disclosed technology includes systems and methods of pre-calculation per input object of a (typically short compared to the length of an object) set of feature values sorted into different bins for identifying likely close matches between objects, such as text documents, that have numerous weighted features, such as specific-length word sequences. Stored objects, weighted features of the objects, and values in bins are used to identify instances of the objects and to test similarity among the objects. For initial weighted features of an object, and a predetermined number of feature bins used to min-hash the object features, as part of calculating an estimated Jaccard similarity index among objects, the method includes scaling initial weights to produce scaled weighted features, using scaling factors automatically selected based on a sum of the initial weights divided by a number of features in a feature set, applying two or more selected scaling factors to scale the initial weights; expanding the scaled weighted features into an expanded set of weighted features of the object that includes one to eight times as many weighted features in the expanded set as the predetermined number of feature bins. During min-hashing of the expanded set of weighted features into the feature bins, the disclosed method includes circularly smearing a feature that qualifies to be inserted by min-hashing into a particular feature bin, including treating the feature bins as a circular buffer so that a first bin follows a last bin for smearing. When a min-hashed feature qualifies to be inserted into bin(i), the qualifying min-hashed value is considered for insertion into bin(i+1) and subsequent bins, including increasing a min-hashed feature value by a predetermined increment at each step of insertion consideration. When an increased min-hashed feature value is considered for insertion into the bin(i+1) and subsequent bins, the method includes inserting the increased min-hashed feature value when a bin under consideration is empty or has a feature bin value greater than the increased min-hashed feature value under consideration; and continuing consideration of the bin(i+1) and subsequent bins, through the circular buffer, until the increased min-hashed feature value fails to quality to be inserted into a particular bin. The method also includes saving completed sets of feature bins for each scaling of the object together with a scaling factor or sum of the initial weights for use in comparing sampled features of the object with sampled features of other objects by calculating an estimated Jaccard similarity index.

A feature of the disclosed technology is that documents can be processed individually, and the completed pre-calculated sets of feature bins for each scaling of the object of the document, together with a scaling factor or sum of the initial weights, can be stored and later used for comparing sampled features of the object to the pre-calculated sampled features of other objects—by calculating an estimated Jaccard similarity index for two objects being compared.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3 shows an example with features and weights that are scaled and rounded.

FIG. 4 shows an example of expanding a feature sample by hashing the feature value, in sequential columns showing the expansion for three different scaled rounded weights, shown in FIG. 3.

FIG. and FIG. 6 illustrate smearing into bins for the first four expanded, min-hashed values for feature sample number one, shown in FIG. 4.

FIG. 7 shows the resultant values in a set of 128 bins after the first four expanded, min-hashed values for feature sample number one are smeared into the set of bins.

DETAILED DESCRIPTION

Introduction

Figure 1:
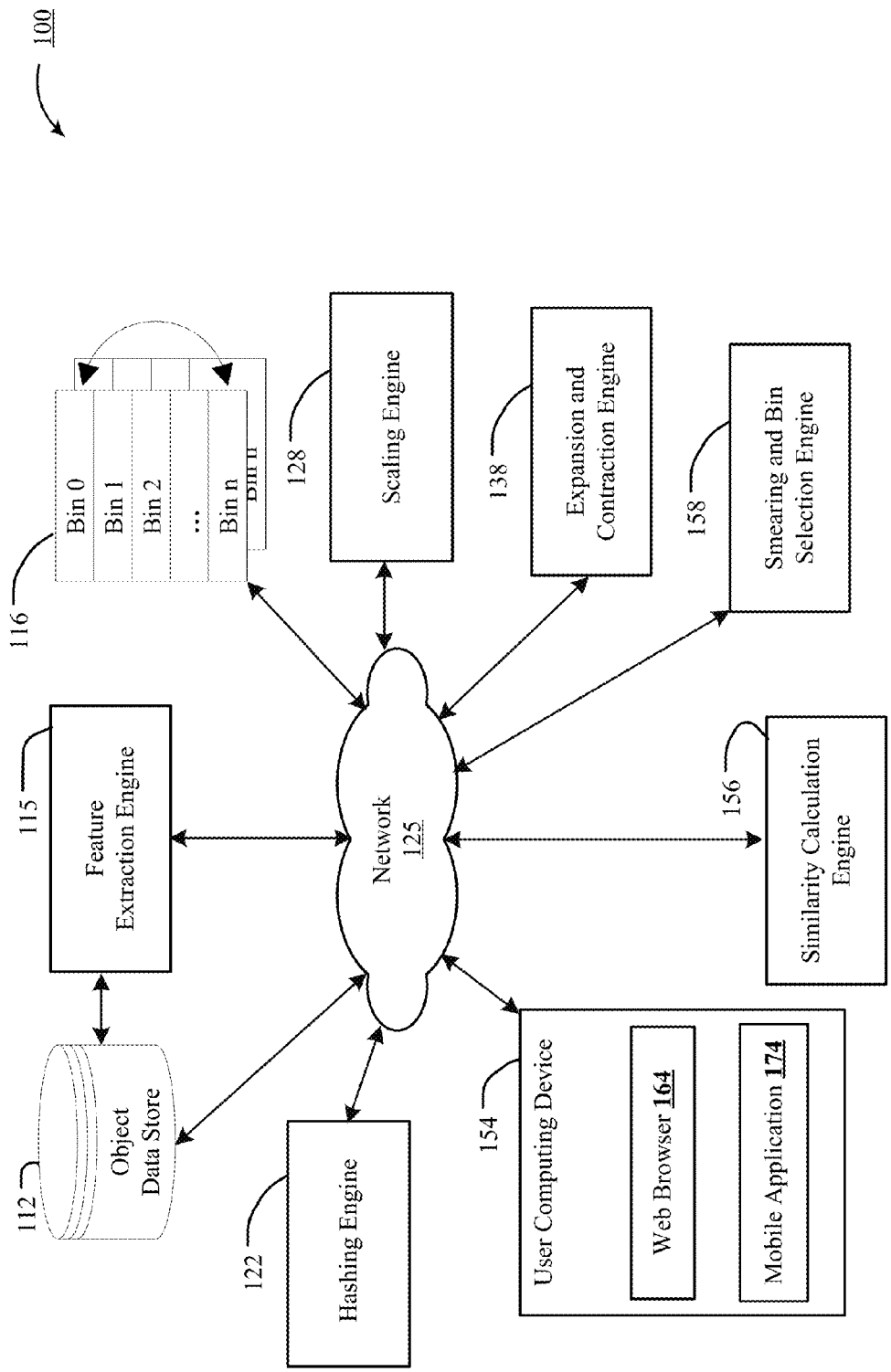
FIG. 1 illustrates one implementation of an environment for of pre-calculation of object feature bin values for identifying close matches between objects that have numerous weighted features.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The disclosed technology includes systems and methods for pre-calculation per input object of (typically short compared to the length of an object) a set of feature bin values for identifying close matches between objects (e.g., text documents) that have numerous weighted features, making it feasible to compute approximate file similarity for very large files. For example, for deduplication of files and for plagiarism detection, the disclosed method assesses similarity between objects, with sampling techniques and comparisons.

Aspects of the disclosed technology include smearing into bins for short documents (like tweets), resulting in analyzing many fewer copies of feature samples than used in previous approaches, with an optimization for long documents that also results in analyzing many fewer copies of samples than previously. Previous approaches to the task of deduplication of files implemented oversampling of the features in a feature set by a factor of sixteen, to greatly reduce the probability of discovering an empty bin. With these new aspects, oversampling can be reduced to a factor of four, which significantly accelerates part of the calculations, while retaining the simplicity of comparing sample sets as vectors of features.

Randomized rounding is an approach used for designing and analyzing problems that are computationally intractable to solve exactly—using the probabilistic method to convert an optimal solution of a relaxation of the problem into an approximately optimal solution to the original problem. Randomized rounding does a surprisingly good job at approximating the ratio, by randomly picking values and weights. The expected value of a randomized rounding of a sum equals the original sum, but the systematic aspects of rounding mean that the approximate values of a ratio will exhibit some bias when compared to the original value. This bias is proportional to the number of terms in each sum, and thus can be controlled to be much smaller in expectation than the Chernoff bound limits on estimation.

How does one sample in such a way that the probability of picking the same sample matches the similarity between two objects? That's where min-hashing comes in: the idea that applying a chosen randomizing function, with output in the range between zero and one, to all of the elements of an input stream and keeping only the numerically smallest of these, produces a value which will match with probability equal to the unweighted Jaccard value; weighted Jaccard is a little harder.

The Jaccard index is useful to help cluster features in information space using only syntax, thus not requiring any natural language understanding to be invoked. The Jaccard similarity coefficient is a commonly used indicator of the similarity between two sets. For sets A and B it is defined to be the ratio of the number of elements of their intersection and the number of elements of their union:

$$J(A,B)=|A \cap B|/|A \cup B|=|A \cap B|/|A|+|B|-|A \cap B|$$

When individual features are weighted with non-negative values, wa, then the weighted Jaccard value can take this weighting into account as well: the L1-norm of a weighted set X is the sum of the weights of all individual items in X. We define min(A,B) to be the weighted set which assigns the numerically smaller of wa(x) and wb(x) to all elements x in the union of A and B, and wa(x) to those x unique to A and wb(x) to those x unique to B; max(A,B) is defined similarly, replacing smaller by larger. In this case, $$J(A,B)=L1(\min(A,B))/L1(\max(A,B)), \text{ i.e.}$$

$$J(A,B)=\text{sum\_}x \text{ in } A \cup B \min(wa(x),wb(x))/\text{sum\_}x \text{ in } A \cup B \max(wa(x),wb(x))$$

weights for elements missing in a set are assigned the value zero. Note that when the weights for elements present in a set are assigned the value one, this is equivalent to the unweighted Jaccard value.

These values are zero when the two sets are disjoint, one when they are equal, and strictly between zero and one otherwise. That is, two sets are more similar, with relatively more feature objects in common, when their Jaccard index is closer to one. Empirically, two sets with a Jaccard value greater than 0.95 are essentially duplicates. For sets with a similarity value of less than 0.75, people interpret that something is substantially different between the two sets.

The goal of the min-wise independent permutations (Min-Hash) is to estimate J(A,B) quickly, without explicitly computing the intersection and union.

For a hash function h that maps the members of A and B to distinct integers, and for set S, hmin(S) is the minimal member of S with respect to h—that is, the member x of S with the minimum value of h(x). When hmin gets applied to both A and B, the same value occurs when the element of the union A U B with minimum hash value lies in the intersection A∩B. The probability that hmin(A)=hmin(B) is true is equal to the similarity J(A,B), assuming randomly chosen sets A and B. In other words, if r is the random variable that is one when hmin(A)=hmin(B) and zero otherwise, then r is an unbiased estimator of J(A,B). The value of r has too high a variance to be a useful estimator for the Jaccard similarity on its own—it is always zero or one. The MinHash scheme is introduced to reduce this variance by averaging together several variables constructed in the same way.

If we expand A by replacing each element x with (x, i) for i between 0 and N*wa(x), for some large integer N, then this produces a set of hmins where agreement converges to the weighted Jaccard value as N tends towards infinity. For sets A and B, imagine applying a randomizing function to the union of the two sets. The element which is numerically smallest will be a uniform random element of the union. The smallest value from A will be the smallest value from B only when it is in the intersection, since it is a random element of the union that happens when the random selection from the union is also in the intersection, which gives us the Jaccard ratio.

For identifying close matches between weighted objects, an input set for an object can be first scaled using a scale from a fixed (although infinite) set of scales, and then values of the input set get scaled by a second scale. The two scales are selected so that two input objects with significant Jaccard similarity will pick the same scale for at least one of their choices. For example, a weighted input set A that maps from some universe of terms to non-negative real numbers can represent an object of interest for comparison. Given a second object with input set B, min(A,B) is the term-wise smaller of A and B. For some scale s, scaling A by s, sA(x) equals s times A(x). Because the Jaccard similarity J(sA, A) is s, for s less than or equal to one, and 1/s for s greater than or equal to one, we get J(sA, sB) equals J(A,B), for non-zero scale s. That is, scaling of initial weights of input weighted features for an object does not affect the Jaccard similarity index.

Documents with vastly different sizes cannot be highly similar. An important fact about Jaccard similarity is that two inputs with vastly different cumulative weights cannot have high Jaccard similarity. Mark S. Manasse describes the reasoning for this assertion and describes L1 norms and Jaccard similarity reasoning in Chapter 2.3, in addition to many related topics in his book, "*On the Efficient Determination of Most Near Neighbors: Horseshoes, Hand Grenades, Web Search and Other Situations When Close is Close Enough*" (2d Ed. 2015), which is hereby incorporated by reference. In one example, for a Jaccard similarity greater than 0.25—that is, four times the sum of values of set A is less than the sum of values of set B—note that the J(A,B) equals the L1 norm for distance between the two sets A; B is the sum of the absolute values of the term-wise difference. L1(min(A,B))/L1(max(A,B)) is less than or equal to L1(A)/L1(B) (because the ratio of non-negative numbers decreases when the numerator is decreased or the denominator increased) which was pre-determined to be less than 0.25. The selected 0.25 similarity value could be any other Jaccard value of interest, in another example. For 0.25, consider L1 norms ranging from four raised to the $k^{th}$ power to four to the (k+1) power. The L1 norm of one document will fall into one such range, and the norm of any document whose norm is within a factor of four will be in the same range or in an adjacent range. That is, to ensure that two documents with close norms will have one or two scale factors in common, scalings get computed for every document using the appropriate range and the next larger range for the set.

Manasse describes in Chapter 7 (page 71) of his book, cited supra, a reasonable approximation scheme for weighted sampling—a biased sampling scheme for estimating weighted Jaccard, with a bias at most equal to the multiplicative inverse of the weight of the sets being sketched. He describes taking advantage of the scale invariance of Jaccard, via a scaling approach with epsilon-bias to the estimator, adding a small additive constant (the multiplicative inverse of epsilon) to the running time. In the cited book, Manasse further provides an explanation of a way to reduce the weighted Jaccard estimation problem to a scaled unweighted problem, and he describes the application of the described algorithms for producing a slightly biased estimator for weighted similarity.

In concept, min-hashing is usable to apply a deterministic randomizing function, with output in the range between zero and one, to all of the elements of the feature vector for an object and keep only the numerically smallest of these, producing a value which will match with probability equal to the Jaccard value, described supra.

The disclosed technology makes use of scaling and randomized rounding of weights for feature values for an object—to approximate the ration; and min-hashing of the scaled, weighted feature values across feature bins, and applying a deterministic random hash function to produce a set of feature values for an object. The hashed feature values are smeared across bins, keeping the smallest value in each feature bin. Because minhashing does not work well with numerous empty bins, smearing is implemented to fill empty bins even when we have short documents, using expansion, based on scaled weights. An environment for pre-calculation of object feature bin values for identifying close matches between objects that have numerous weighted features and a worked example with numerical values are described infra.

Environment

FIG. 1 illustrates one environment 100 for compact statistics-preserving sampling for pre-calculation, per input object, of feature bin values for identifying close matches between objects that have numerous weighted features. Environment 100 includes object data store 112 that stores text documents, tweets and other short message objects. In some implementations, stored objects can include graphical image files. Object data store 112 also stores sets of weighted features of the stored objects. For some implementations, feature extraction engine 115 can extract weighted features for objects in object data store 112. Feature bins 116 hold sets of weighted features of objects in object data store 112 and values placed in feature bins 116 during min-hashing. Feature bins 116 are arranged in a circular buffer so that a first bin follows a last bin, for smearing.

Environment 100 also includes scaling engine 128 for scaling initial feature weights to produce scaled-weighted features, using scaling factors automatically selected based on a sum of the initial weights for an object's features, divided by a number of features in a feature set for an object. Scaling engine 128 can apply two or more selected scaling factors. Further included in environment 100 is expansion and contraction engine 138 for expanding scaled-weighted features into two or more expanded sets of weighted features of the object that includes one to eight times as many weighted features as the predetermined number of feature bins. Particular scaled-weighted features get expanded into multiple feature samples in proportion to respective weights of the particular scaled weighted features. Additionally, expansion and contraction engine 138 applies randomized rounding selection to scaled-weighted features to select contracted sets of weighted features of the object, in which each contracted set includes one to eight times as many weighted features as the predetermined number of feature bins 115.

Smearing and bin selection engine 158 in environment 100 treats feature bins 116 as a circular buffer, so that a first bin follows a last bin for smearing. Smearing and bin selection engine 158 smears and then selects the bins for each weighted smeared feature value, by comparing the fractional residual weight value to a pseudo-randomized rounding hash function of the feature value. A smearing and bin selection example is described infra. Hashing engine 122 generates deterministic pseudo-random hashes usable for generating the hashed feature values. For some implementations, similarity calculation engine 156 compares these pre-calculated min-hashed values in a set of feature bins 116 for one object to the final min-hashed values in a set of feature bins 116 for a different object, to learn the degree of similarity between the two compared objects.

User computing device 154 for interacting with the compact statistics-preserving sampling environment 100 includes a web browser 164 and/or a mobile application 174. User computing device 154 can be a personal computer, laptop computer, tablet computer, smartphone, personal digital assistant (PDA), digital image capture devices, and the like.

In some implementations, the modules of environment 100 can be of varying types including workstations, servers, computing clusters, blade servers, server farms, or any other data processing systems or computing devices. Modules can be communicably coupled to the data store via a different network connection. For example, object data store 112 and feature extraction engine 115 can be coupled via the network 125 (e.g., the Internet) and feature bins 116 can be coupled to a direct network link and can additionally be coupled via a direct link to object data store 112. In some implementations, user computing device 154 may be connected via a WiFi hotspot.

In some implementations, network(s) 125 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In other implementations, environment 100 may not have the same elements as those listed above and/or may have other/different elements instead of, or in addition to, those listed above.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Figure 2:
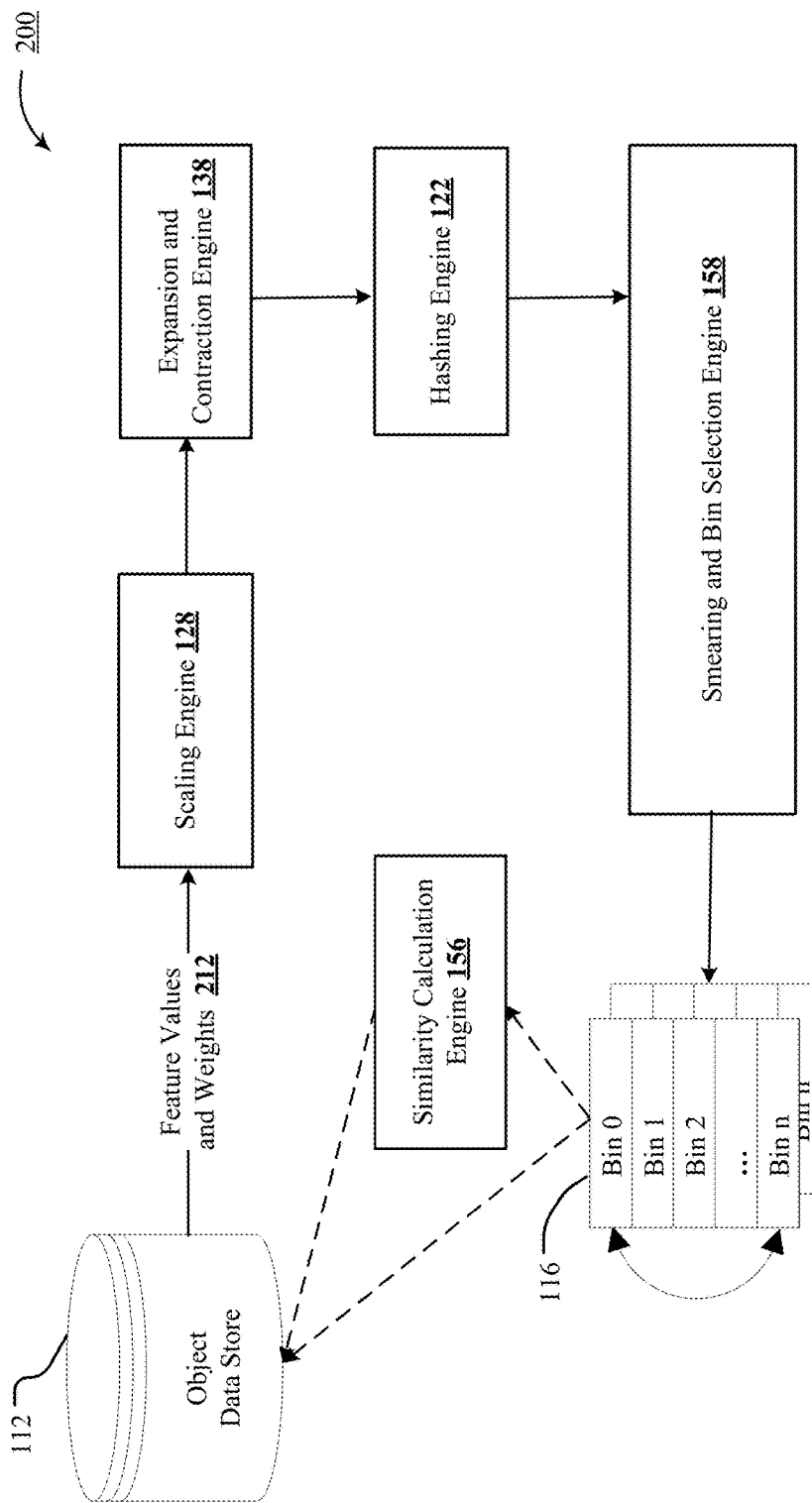
FIG. 2 illustrates, in a block diagram, the progression for the feature set for a single object through similarity estimation with compact statistics preserving sampling.

Minwise hashing is an established technique for efficiently reducing the number of comparison points needed to estimate set similarity between objects in massive datasets—using a randomized algorithm to quickly estimate the Jaccard similarity. FIG. 2 block diagram 200 illustrates the progression for the feature set for a single object with pre-calculation, per object, of object feature bin values for identifying close matches between objects. Object data store 112 stores sets of features and weights for stored objects. Feature values and weights 212 for an object get scaled by scaling engine 128 that scales initial weights to produce scaled weighted features, using scaling factors automatically selected based on a sum of the initial weights divided by a number of features in a feature set, and applying two or more selected scaling factors to scale the initial weights. Expansion and contraction engine 138 expands the scaled weights for the object features into an expanded set of weighted features of the object. Hashing engine 122 processes the weighted features. The expanded set includes one to eight times as many weighted features as the predetermined number of feature bins. In some implementations, the expanded set can include four to five times as many weighted features as the predetermined number of feature bins. One method of expansion includes rounding input scaled weights to integers plus randomized rounding of any fractional remainder, as described infra. For some cases, expansion and contraction engine 138 applies randomized rounding selection to the scaled-weighted features to select contracted sets of weighted features of the object, wherein each contracted set includes one to eight times as many weighted features as the predetermined number of feature bins. After min-hashing of the expanded set of weighted features by hashing engine 122, smearing and bin selection engine 158 circularly smears a feature that qualifies to be inserted by min-hashing into a particular feature bin 116. Smearing and bin selection engine 158 treats the feature bins as a circular buffer so that a first bin follows a last bin for smearing. When a min-hashed feature qualifies to be inserted into bin (i), the qualifying min-hashed value is considered for insertion into bin (i+1) and subsequent bins, including increasing a min-hashed feature value by a predetermined increment at each step of insertion consideration. When an increased min-hashed feature value is considered for insertion into the bin (i+1) and subsequent bins, smearing and bin selection engine 158 inserts the increased min-hashed feature value when a bin under consideration is empty or has a feature bin value greater than the increased min-hashed feature value under consideration. Smearing and bin selection engine 158 continues consideration of the bin (i+1) and subsequent bins, through the circular buffer, until the increased min-hashed feature value fails to quality to be inserted into a particular bin. Completed sets of feature bins and scalings for an object get stored in object data store 112. For each document, the exponent of the smallest scaling and the vector of samples (or their hashes) for each scaling, only two when the base is two and the similarity level below which we don't care to measure similarity is one half. Decreasing the scaling base leads to keeping more shorter vectors, so the number of retained samples is unchanged, while decreasing the threshold of indifference requires increasing the number of scalings to cover a broader range in which to have overlapping scalings. For some use cases, four scalings could be used, differing by the square root of two in each scaling, which could result in three or even four overlapping scalings. A worked example is illustrated infra.

In some implementations, similarity calculation engine 156 compares stored completed sets of feature bins for each scaling of the object and scaling factors of the object, to stored completed sets of feature bins of other objects, by calculating an estimated Jaccard similarity index. Comparison results are also stored in object data store 112.

FIG. 3 through FIG. 6 show an example of pre-calculation, per object, of object-feature bin values for identifying close matches between objects that have numerous weighted features. In FIG. 3, an example object is represented by nineteen feature numbers 310 with nineteen feature weights 312, and a predetermined number of one hundred twenty-eight feature bins. In this example, to generate eight feature values per bin, the nineteen feature samples can be divided into the number of bins (256 divided by 19) to obtain eight as the closest factor of two. Scaling engine 128 scales feature weights 312 to produce scaled feature weights by eight 313, scaled feature weights by sixteen 314 (the order of two adjacent to eight), and scaled feature weights by thirty-two 315 (the order of two adjacent to sixteen). Note that the scaling factors are adjacent factors of two. As noted supra, two documents with close norms will have one or two scale factors in common, so scaling engine 128 selects adjacent scale factors, using the appropriate range and the next larger range for the set.

Continuing with the example in FIG. 3, a randomized rounding threshold 316 has been applied to the three sets of scaled feature weights: scaled feature weights by eight 313, scaled feature weights by sixteen 314, and scaled feature weights by thirty-two 315. For the example, expansion and contraction engine 138 applies randomized rounding to the scaled-weighted features to select sets of weighted features of the object. The weight rounds to the lower of the two integers that could represent the scaled feature weight for values for which the fractional part of the scaled feature weight is less than the randomized rounding threshold 316. For fractional parts greater than the randomized rounding threshold 316 for a scaled weight, the feature weight rounds to the larger of the two possible integers. Feature weights scaled by eight and rounded 317, feature weights scaled by sixteen and rounded 318, and feature weights scaled by thirty-two and rounded 319 show how many times to use a given feature value—that is, the weighting of the feature values 311.

FIG. 4 shows sample one expanded 411, with feature value one (406) hashed using a deterministic pseudo-random hashing function. For the scaling by eight 317, sample one is expanded to eleven values 412, with hashed feature values 413. For the scaling by sixteen, sample one is expanded to twenty-four hashed feature values 415, and for scaling by thirty-two, sample one is expanded to forty-five hashed feature values 417.

FIG. 5 and FIG. 6 continue the example, showing the smearing and bin selection for the first four hashed values for the expanded sample one, after weighting by eight and randomized rounding the weight. Smearing and bin selection engine 158 circularly smears a feature value that qualifies to be inserted by min-hashing into a particular feature bin 116, represented by the bin number 510. For smearing the feature value of (406,1) 511, the fractional part of hashed feature value 56.2624 424 gets inserted into bin fifty-six 555, and then the feature value is circularly smeared, increasing the min-hashed feature value by a predetermined increment at each step of insertion consideration—the increment is one for this example. When an increased min-hashed feature value is considered for insertion into the bin (i+1) and subsequent bins, inserting the increased min-hashed feature value gets inserted when a bin under consideration is empty or has a feature bin value greater than the increased min-hashed feature value under consideration. Consideration of the bin (i+1) and subsequent bins, through the circular buffer, continues until the increased min-hashed feature value fails to quality to be inserted into a particular bin, after which it will always lose to the increased value to which it loses in the present bin. In this example, because hashed feature value 56.2624 424 is the first value to be smeared into previously-empty bins, the smearing goes through the one hundred twenty-eight bins. Next, feature (406,2) 515 gets inserted into a bin based on the fractional part of the hashed feature. The fractional part of hashed feature value 0.1794 434 gets inserted into bin zero 512, and then the feature value is circularly smeared through bin fifty-five, increasing the inserted min-hashed feature value by one for each subsequent bin, until an already-stored feature bin value is less than the increased min-hashed feature value under consideration for insertion. The smearing stops after bin fifty-five because bin fifty-six already contains a smaller value 0.2624 555. That is, for each iteration of adding a hashed feature value to a bin, a smeared value is only inserted into a bin if the value is less than the current value in that bin.

Continuing with the smearing and bin selection process example with a third feature-value-one expansion for (406,3) 516, the fractional part of hashed feature value 61.8984 444 gets inserted into bin sixty-one 568. Then the feature value is circularly smeared through bin one hundred twenty-seven—shown in FIG. 6 which shows bin number seventy-six through bin number one hundred twenty-seven—increasing the inserted min-hashed feature value by one for each subsequent bin, until an already-stored feature bin value is less than the increased min-hashed feature value under consideration for insertion. The smearing stops after bin one hundred twenty-seven, because bin zero already contains a smaller value 0.1794 512.

For increased efficiency, we can postpone smearing until after we place most items into the bins where they naturally fall, although this requires having a special marker to indicate a still-empty bin. By smearing at first insertion, we guarantee that no bin is empty, obviating the need to denote an empty bin.

Continuing with the smearing-and-bin-selection process example with one more expansion of feature value one (406,4) 618, the fractional part of hashed feature value 121.2611 454 gets inserted into bin one hundred twenty-one 678. Then the feature value is circularly smeared through bin one hundred twenty-seven, increasing the inserted min-hashed feature value by one for each subsequent bin, until an already-stored feature bin value is less than the increased min-hashed feature value under consideration for insertion. The smearing stops after bin one hundred twenty-seven, again because bin zero already contains a smaller value 0.1794 512.

FIG. 7 shows the resultant hashed feature values 700 in bins zero through one hundred twenty-seven, after smearing and inserting the first four expansions of feature value one. Min-hashing of the remaining members of the expanded set of weighted features into the feature bins, circularly smearing the feature values that qualify to be inserted into a particular feature bin continues for the nineteen features 311 in the example. The weighted, randomly rounded feature weights result in eleven expanded hashed values for each feature value, in the scaled-by-eight scenario. For the scaled-by-sixteen scenario, a second set of bins is used for circularly smearing and inserting values into bins, and a third set of bins would be used for the scaled-by thirty-two scenario.

Completed sets of the feature bins for each scaling of the object together with a scaling factor or sum of the initial weights are saved for use in comparing sampled features of the object with sampled features of other objects by calculating an estimated Jaccard similarity index.

Workflow

Figure 8:
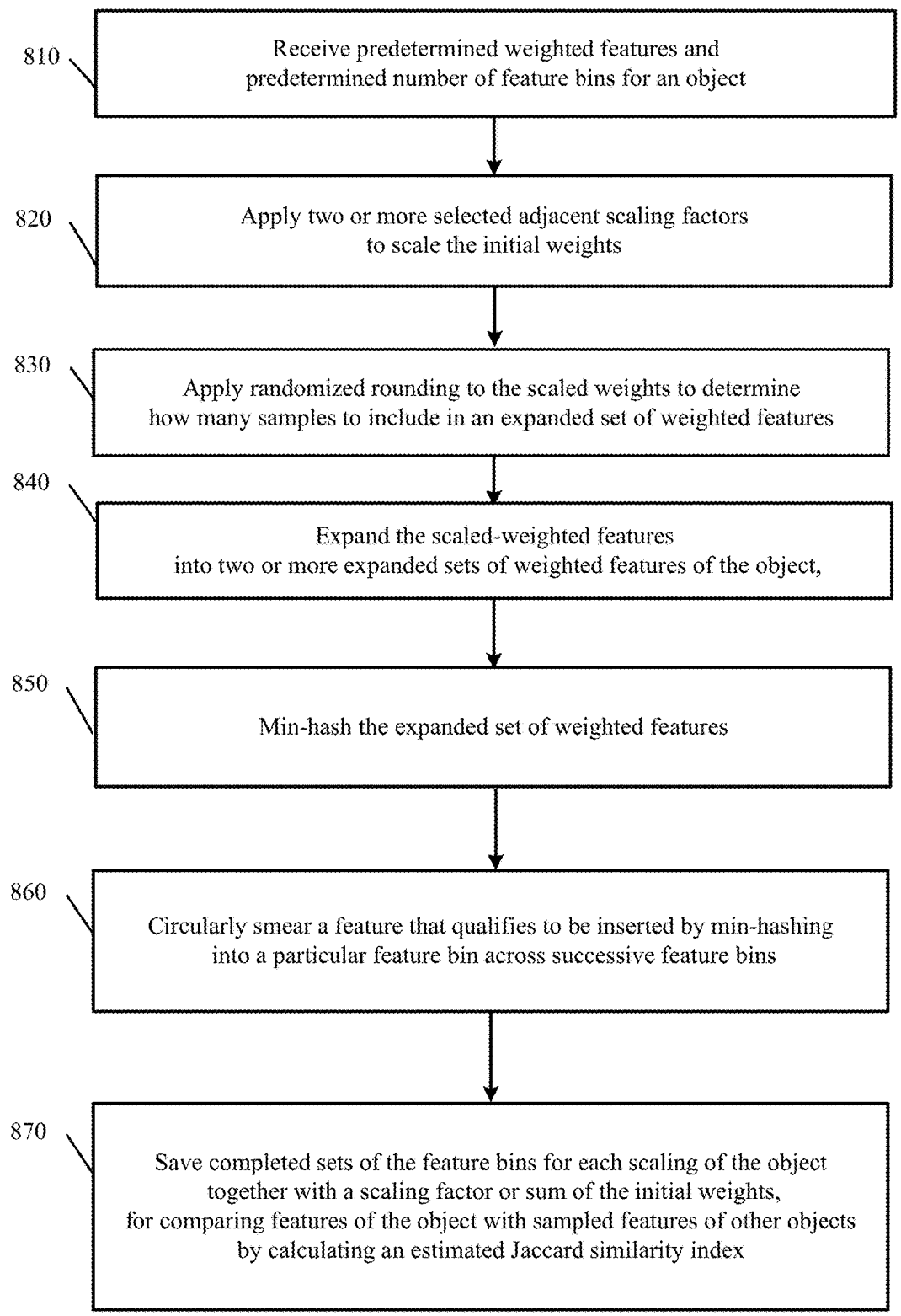
FIG. 8 is an example workflow for pre-calculating object feature bin values for identifying close matches between objects that have numerous weighted features.

FIG. 8 is a flowchart 800 of one implementation of an environment for pre-calculation, per object, of object feature bin values for identifying close matches between objects (e.g., text documents) that have numerous weighted features. Flowchart 800 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this flowchart is described with reference to a method.

At action 810, receive numerous predetermined weighted features for an object and a predetermined number of feature bins, from object data store 112.

At action 820, apply two or more selected adjacent scaling factors to scale the initial weights, using scaling factors automatically selected based on a sum of the initial weights divided by a number of features in a feature set, applying two or more of the selected scaling factors, to scale the initial weights for min-hashing into one set of feature bins per scaling factor. When adjacent scaling factors are used, cases on the edge have overlapping scaling factors.

At action 830, apply randomized rounding to the scaled weights to determine how many samples to include in an expanded set of weighted features—applying randomized rounding to calculate a floor or ceiling integer from a scaled weight of the scaled-weighted feature and using the floor or ceiling integer to determine how many samples of the particular scaled-weighted feature to include in a particular expanded set of weighted features of the object.

At action 840, expand the scaled-weighted features into two or more expanded sets of weighted features of the object. Each expanded set includes one to eight times as many weighted features as the predetermined number of feature bins. Expanding the particular scaled-weighted feature produces multiple instances of feature samples in proportion to respective scaled weight of the particular scaled-weighted feature.

At action 850, hash the expanded set of weighted features, applying a deterministic randomizing function, with output in the range between zero and one, to all of the elements of the feature vector for the object.

At action 860, circularly smear a feature that qualifies to be inserted by min-hashing into a particular feature bin across successive feature bins.

At action 870, save completed sets of the feature bins for each scaling of the object together with a scaling factor or sum of the initial weights for comparing features of the object with sampled features of other objects by calculating an estimated Jaccard similarity index.

The actions described above can be subdivided into more steps or combined into fewer steps to carry out the method described using a different number or arrangement of steps.

Figure 9:
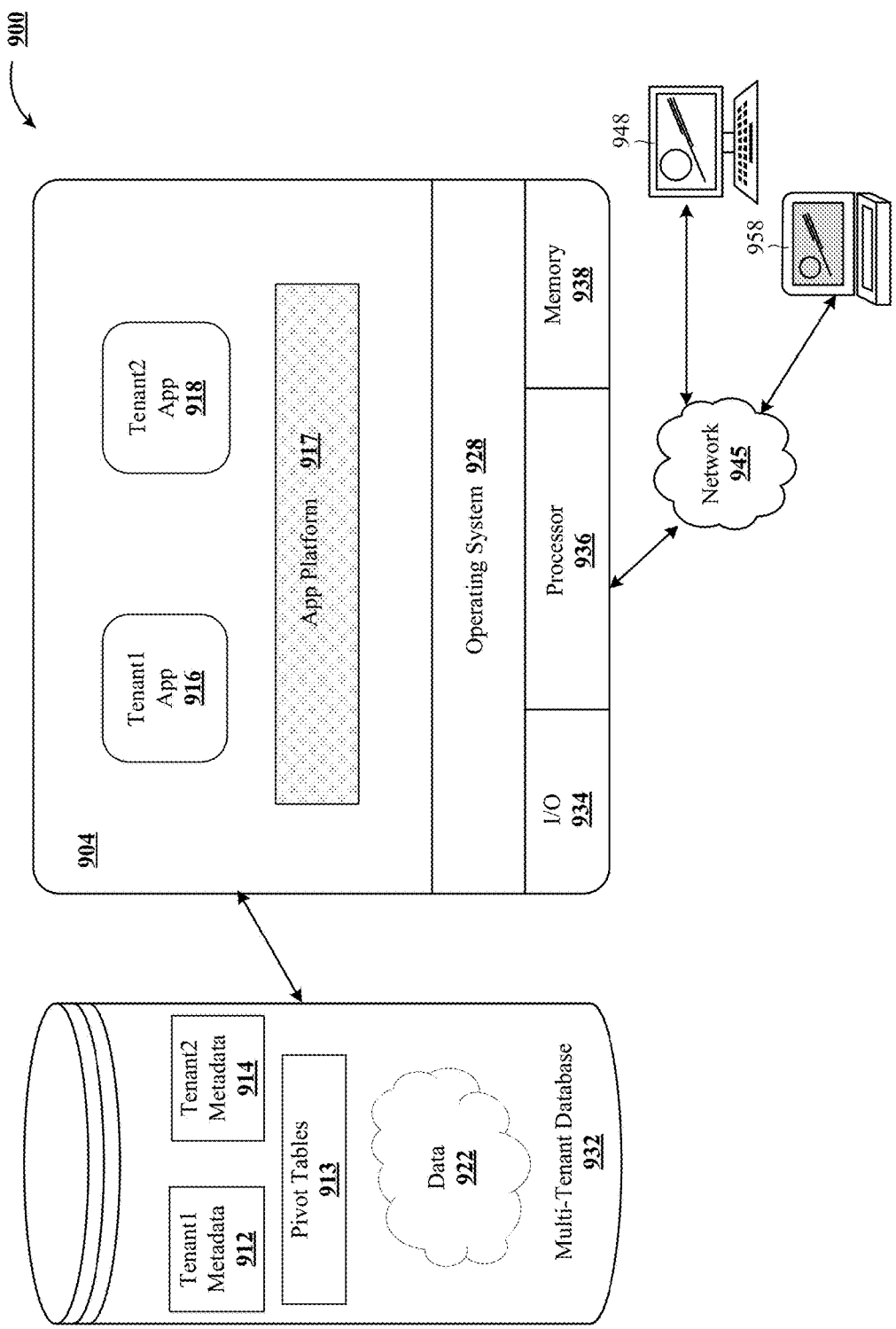
FIG. 9 is an example environment for implementing pre-calculation of object feature bin values for identifying close matches between objects that have numerous weighted features.

FIG. 9 presents a block diagram of an exemplary multi-tenant system 900 suitable for implementing pre-calculation of object feature bin values for identifying close matches between objects (e.g., text documents) that have numerous weighted features in environment 100 of FIG. 1. In general, the illustrated multi-tenant system 900 of FIG. 9 includes a server 904 that dynamically supports virtual applications 916 and 918, based upon data 922 from a common database 932 that is shared between multiple tenants, alternatively referred to herein as a "multi-tenant database". Data and services generated by the virtual applications 916 and 918, including GUI clients, are provided via a network 945 to any number of client devices 948 or 958, as desired.

As used herein, a "tenant" or an "organization" refers to a group of one or more users that shares access to common subset of the data within the multi-tenant database 932. In this regard, each tenant includes one or more users associated with, assigned to, or otherwise belonging to that respective tenant. Stated another way, each respective user within the multi-tenant system 900 is associated with, assigned to, or otherwise belongs to a particular tenant of the plurality of tenants supported by the multi-tenant system 900. Tenants may represent users, user departments, work or legal organizations, and/or any other entities that maintain data for particular sets of users within the multi-tenant system 900. Although multiple tenants may share access to the server 904 and the database 932, the particular data and services provided from the server 904 to each tenant can be securely isolated from those provided to other tenants. The multi-tenant architecture therefore allows different sets of users to share functionality and hardware resources without necessarily sharing any of the data 922 belonging to or otherwise associated with other tenants.

The multi-tenant database 932 is any sort of repository or other data storage system capable of storing and managing the data 922 associated with any number of tenants. The database 932 may be implemented using any type of conventional database server hardware. In various implementations, the database 932 shares processing hardware with the server 904. In other implementations, the database 932 is implemented using separate physical and/or virtual database server hardware that communicates with the server 904 to perform the various functions described herein. The multi-tenant database 932 may alternatively be referred to herein as an on-demand database, in that the multi-tenant database 932 provides (or is available to provide) data at run-time to on-demand virtual applications 916 or 918 generated by the application platform 917, with tenant1 metadata 912 and tenant2 metadata 914 securely isolated.

In practice, the data 922 may be organized and formatted in any manner to support the application platform 922. In various implementations, conventional data relationships are established using any number of pivot tables 913 that establish indexing, uniqueness, relationships between entities, and/or other aspects of conventional database organization as desired.

The server 904 is implemented using one or more actual and/or virtual computing systems that collectively provide the dynamic application platform 917 for generating the virtual applications. For example, the server 904 may be implemented using a cluster of actual and/or virtual servers operating in conjunction with each other, typically in association with conventional network communications, cluster management, load balancing and other features as appropriate. The server 904 operates with any sort of conventional processing hardware such as a processor 936, memory 938, input/output features 934 and the like. The input/output 934 generally represent the interface(s) to networks (e.g., to the network 945, or any other local area, wide area or other network), mass storage, display devices, data entry devices and/or the like. User interface input devices 934 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 917.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 936 to the user or to another machine or computer system.

The processor 936 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 938 represents any non-transitory short or long term storage or other computer-readable media capable of storing programming instructions for execution on the processor 936, including any sort of random access memory (RAM), read only memory (ROM), flash memory, magnetic or optical mass storage, and/or the like. The computer-executable programming instructions, when read and executed by the server 904 and/or processor 936, cause the server 904 and/or processor 936 to create, generate, or otherwise facilitate the application platform 917 and/or virtual applications 916 and 918, and perform one or more additional tasks, operations, functions, and/or processes described herein. It should be noted that the memory 938 represents one suitable implementation of such computer-readable media, and alternatively or additionally, the server 904 could receive and cooperate with external computer-readable media that is realized as a portable or mobile component or application platform, e.g., a portable hard drive, a USB flash drive, an optical disc, or the like.

The application platform 917 is any sort of software application or other data processing engine that generates the virtual applications 916 and 918 that provide data and/or services to the client devices 948 and 958. In a typical implementation, the application platform 917 gains access to processing resources, communications interfaces and other features of the processing hardware using any sort of conventional or proprietary operating system 928. The virtual applications 916 and 918 are typically generated at run-time in response to input received from the client devices 948 and 958.

With continued reference to FIG. 9, the data and services provided by the server 904 can be retrieved using any sort of personal computer, mobile telephone, tablet or other network-enabled client device 948 or 958 on the network 945. In an exemplary implementation, the client device 948 or 958 includes a display device, such as a monitor, screen, or another conventional electronic display capable of graphically presenting data and/or information retrieved from the multi-tenant database 932.

In some implementations, network(s) 945 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

In one implementation, a disclosed method of pre-calculation per object, of object feature bin values for identifying close matches between objects (e.g., text documents) that have numerous weighted features (e.g., six word sequences) includes, during min-hashing of a set of weighted features into a predetermined number of feature bins, circularly smearing a feature that qualifies to be inserted by min-hashing into a particular feature bin across successive feature bins, using a processor and memory coupled to the processor, the memory holding objects, sets of weighted features of the objects, and values placed in the feature bins by min-hashing. The circularly smearing includes treating the feature bins as a circular buffer so that a first bin follows a last bin for smearing. When a min-hashed value of a particular feature qualifies to be inserted into bin (i), the qualifying min-hashed value is considered for insertion into bin (i+1) and subsequent bins, including increasing a min-hashed value by a predetermined increment at each successive step of insertion consideration; when an increased min-hashed value is considered for insertion into the bin (i+1) and subsequent bins, inserting the increased min-hashed value when a bin under consideration is empty or holds a bin value greater than the increased min-hashed value under consideration; and continuing consideration of the bin (i+2) and subsequent bins, through the circular buffer, until the increased min-hashed value fails to qualify to be inserted into a bin under consideration. The disclosed method also includes saving a completed set of the feature bins for one or more scalings of weights of the object together with a scaling factor or sum of feature weights for use in comparing sampled features of the object with sampled features of other objects when calculating an estimated Jaccard similarity index. The disclosed method further includes min-hashing by inserting min-hashed values into bins using a fractional part of a min-hashed value produced by hashing a feature value or, in an expanded set of feature values, the feature value combined with a sequence number, into a range spanning the predetermined number of feature bins.

The disclosed method also includes min-hashing by inserting min-hashed values into bins using a fractional part of a min-hashed value produced by hashing a feature value and, in an expanded set of feature values, the feature value combined with a sequence number, into a range spanning the predetermined number of feature bins, inserting a new minimum fractional part value into a feature bin under consideration when the fractional part of the min-hashed value is less than a current contents of the feature bin under consideration. The disclosed method can further include min-hashing by inserting min-hashed values into bins using a fractional part of a min-hashed value produced by hashing a feature value and, in an expanded set of feature values, the feature value combined with a sequence number, into a range spanning the predetermined number of feature bins, inserting a new maximum fractional part value into a feature bin under consideration when the fractional part of the min-hashed value is greater than a current contents of the feature bin under consideration. The disclosed method yet further includes, for a first and second object, each having the scaling factor or the sum of feature weights, determining a maximum possible similarity between the first and second object by comparing sums of the feature weights or scaled-weights of the features of the first and second object; and when the maximum possible similarity between the first and second object is less than a predetermined threshold, rejecting similarity between the first and second object without counting matches of the values in the feature bins saved for the first object with the values in the feature bins saved for the second object. The method additionally includes, for a first and second object, each having a completed set of feature bins, calculating the estimated Jaccard similarity index based on a count of matches of the values in the feature bins saved for the first object with the values in the feature bins saved for the second object. For some implementations, the disclosed method includes, for a first and second object, each having a completed set of feature bins, calculating the estimated Jaccard similarity index based on a comparison of the values in selected feature bins saved for the first object with the values in the feature bins saved for the second object, wherein the selected feature bins for the first and second object have matching scaling factors. The method further includes selecting two or more scaling factors to apply to the set of weighted features and mapping the scaled-weights into two or more respective sets of feature bins.

For some implementations of the disclosed method, two or more scaling factors can be selected to be applied to the set of weighted features based on the logarithm of the L1 norm of a set, using a base related to the desired minimum degree of similarity to be able to detect. When a pre-determined similarity threshold equals 0.5, one would typically choose a base of 2, so that potentially similar documents are guaranteed to choose identical or adjacent scaling factors. For increased efficiency, when the pre-determined similarity threshold equals 0.25, one may still choose powers of two for the scaling factor, and can choose four scalings with fewer samples per scale; for 0.25 to 0.5 similarity, documents will share at least one common scaling, but for higher similarity, they will share at least three common scalings, so the number of shared samples will be larger.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For some implementations, a disclosed method of pre-calculation per object of object feature bin values for identifying close matches between objects (e.g., text documents) that have numerous weighted features (e.g., six word sequences) includes during min-hashing of an expanded set of weighted features into a predetermined number of feature bins, circularly smearing a feature that qualifies to be inserted by min-hashing into a particular feature bin across successive feature bins, using a processor and memory coupled to the processor, the memory holding objects, sets of weighted features of the objects, and values placed in the feature bins by min-hashing, for initial weighted features of an object and a predetermined number of the feature bins used to receive the values produced by the min-hashing of the weighted features, as part of calculating an estimated Jaccard similarity index among objects. The method also includes scaling initial weights to produce scaled-weighted features, using scaling factors automatically selected based on a sum of the initial weights divided by a number of features in a feature set; applying two or more of the selected scaling factors to scale the initial weights for min-hashing into one set of feature bins per scaling factor; expanding the scaled-weighted features into two or more expanded sets of weighted features of the object, wherein each expanded set includes 1 to 8 times as many weighted features as the predetermined number of feature bins; expanding the particular scaled-weighted feature produces multiple instances of feature samples in proportion to respective scaled weight of the particular scaled-weighted feature; and min-hashing the expanded sets, with circularly smearing incremented fractional parts of a min-hashed value under consideration, so that the incremented fractional part of the min-hashed value is considered as a candidate to be inserted into at least one successive bin after insertion into an initial min-hash selected bin. The disclosed method further includes saving completed sets of the feature bins for each scaling of weights of the object together with a scaling factor or sum of feature weights for use in comparing sampled features of the object with sampled features of other objects by calculating an estimated Jaccard similarity index.

For some implementations of the disclosed method, each expanded set includes not more than four times as many weighted features as the predetermined number of feature bins. For other implementations, each expanded set includes not more than five times as many weighted features as the predetermined number of feature bins. The two or more selected scaling factors are successive powers of two. Some implementations include applying three selected scaling factors and saving three completed sets of the feature bins. Other implementations include applying four selected scaling factors and saving four completed sets of the feature bins. In some implementations, the method includes, for a first and second object, each having a completed set of feature bins, calculating the estimated Jaccard similarity index based on a count of matches of the values in the feature bins saved for the first object with the values in the feature bins saved for the second object. The disclosed method can further include, for a first and second object, each having a completed set of feature bins, calculating the estimated Jaccard similarity index based on a comparison of the values in selected feature bins saved for the first object with the values in the feature bins saved for the second object, wherein the selected feature bins for the first and second object have matching scaling factors.

For some implementations of the disclosed method, expanding a particular scaled-weighted feature includes applying randomized rounding to calculate a floor or ceiling integer from a scaled weight of the scaled-weighted feature and using the floor or ceiling integer to determine how many samples of the particular scaled-weighted feature to include in a particular expanded set of weighted features of the object. The method further includes during the min-hashing, hashing a combination of the feature value of the feature and a sequence number for the samples of the particular scaled-weighted feature.

In another implementation, a disclosed method of pre-calculation of object feature bin values for identifying close matches between objects (e.g., text documents) that have numerous weighted features (e.g., six word sequences) includes, during min-hashing of a down-scaled set of weighted features into a predetermined number of feature bins, circularly smearing a feature that qualifies to be inserted by min-hashing into a particular feature bin across successive feature bins, using a processor and memory coupled to the processor, the memory holding objects, sets of weighted features of the objects, and values placed in the feature bins by min-hashing, for initial weighted features of an object and a predetermined number of the feature bins used to receive the values produced by the min-hashing of the weighted features, as part of calculating an estimated Jaccard similarity index among objects. The disclosed method also includes scaling initial weights to produce scaled-weighted features, using scaling factors automatically selected based on a sum of the initial weights divided by a number of features in a feature set, applying two or more of the selected scaling factors—adjacent factors, so that cases on the edge have overlapping scaling factors—to scale the initial weights for min-hashing into one set of feature bins per scaling factor. The method further includes applying randomized rounding selection to the scaled-weighted features to select contracted sets of weighted features of the object, wherein each contracted set includes as least as many weighted features as the predetermined number of feature bins, min-hashing the expanded sets, with circularly smearing incremented fractional parts of a min-hashed value under consideration, so that the incremented fractional part of the min-hashed value is considered as a candidate to be inserted into at least one successive bin after insertion into an initial min-hash selected bin; and saving completed sets of the feature bins for each of scaling weights of the object together with a scaling factor or sum of feature weights for use in comparing sampled features of the object with sampled features of other objects by calculating an estimated Jaccard similarity index. For some implementations of the disclosed method, each expanded set includes not more than eight times as many weighted features as the predetermined number of feature bins. For some implementations of the disclosed method, each expanded set includes not more than four times as many weighted features as the predetermined number of feature bins, and can include applying four selected scaling factors and saving four completed sets of the feature bins. The method further includes for a first and second object, each having a completed set of feature bins, calculating the estimated Jaccard similarity index based on a comparison of the values in selected feature bins saved for the first object with the values in the feature bins saved for the second object, wherein the selected feature bins for the first and second object have matching scaling factors. For some implementations of the method, expanding a particular scaled-weighted feature further includes applying randomized rounding to calculate a floor or ceiling integer from a scaled weight of the scaled-weighted feature and using the floor or ceiling integer to determine how many samples of the particular scaled-weighted feature to include in a particular expanded set weighted features of the object.

One implementation of a disclosed method of pre-calculation per object of object feature bin values for identifying close matches between objects (e.g., text documents) that have numerous weighted features (e.g., six word sequences) includes during min-hashing of an expanded set of weighted features into a predetermined number of feature bins, circularly smearing a feature that qualifies to be inserted by min-hashing into a particular feature bin across successive feature bins, using a processor and memory coupled to the processor, the memory holding objects, sets of weighted features of the objects, and values placed in the feature bins by min-hashing. For initial weighted features of an object and the predetermined number of the feature bins used to receive the values produced by the min-hashing of the weighted features, as part of calculating an estimated Jaccard similarity index among objects: the disclosed method includes scaling initial weights to produce scaled-weighted features, using scaling factors automatically selected based on a sum of the initial weights divided by a number of features in a feature set, applying two or more of the selected scaling factors—including adjacent factors, so that cases on the edge have overlapping scaling factors—to scale the initial weights for min-hashing into one set of feature bins per scaling factor. The method further includes expanding the scaled-weighted features into two or more expanded sets of weighted features of the object that includes at least as many weighted features as the predetermined number of feature bins, expanding particular scaled-weighted features into multiple feature samples in proportion to respective weights of the particular scaled weighted features. For some implementations, the expanded sets of weighted features of the object can include one to eight times as many weighted features as the predetermined number of feature bins. For other implementations, the expanded sets of weighted features of the object can include four to five times as many weighted features as the predetermined number of feature bins. The method also discloses circularly smearing, which includes treating the feature bins as a circular buffer so that a first bin follows a last bin for smearing. When a min-hashed value of a particular feature qualifies to be inserted into bin (i), the qualifying min-hashed value is considered for insertion into bin (i+1) and subsequent bins, including increasing a min-hashed value by a predetermined increment at each successive step of insertion consideration. For some use cases the increment is by one. When an increased min-hashed value is considered for insertion into the bin (i+1) and subsequent bins, the disclosed method includes inserting the increased min-hashed value when a bin under consideration is empty or holds a bin value greater than the increased min-hashed value under consideration, and continuing consideration of the bin (i+2) and subsequent bins, through the circular buffer, until the increased min-hashed value fails to qualify to be inserted into a bin under consideration. The method additionally includes saving completed sets of the feature bins for each scaling of the object together with a scaling factor or sum of the initial weights for use in comparing sampled features of the object with sampled features of other objects by calculating an estimated Jaccard similarity index.

In one implementation, the disclosed method further includes scaling weights of a weighted set such that the sum of weights is less than or equal to an oversampling factor of samples per bin times the number of bins to fill. In one example implementation, the disclosed method includes scaling the weights to sum to roughly the number of samples to be drawn—scaling by a power of 2, and the next power of two with a higher value. The method includes, for each input, randomly rounding the scaled weight $w_i$ to an integer $W_i$ using a random value depending on the contents of feature $F_i$. The method also includes generating new features $(F_i, 0)$, $(F_i, 1)$ to $(F_i, W_{i-1})$ and picking a random value $R_{i,j}$ in the range [0, k), where k is the number of samples corresponding to the pair $(F_{i,j})$. In bin slot floor $(R_{i,j})$, this feature contends for min hash with value frac $(R_{i,j})$; in the next bin slot contends with that value plus one, and continues with that pattern through the values. The disclosed method ensures that each bin slot has at least one contender, and that the expected number of natural contenders is at least one.

Another implementation may include a device that provides access to content in a multi-tier file system, the device including a processor, memory coupled to the processor, and computer instructions loaded into the memory that, when executed, cause the processor to implement a process that can implement any of the methods described above.

Yet another implementation may include a tangible non-transitory computer readable storage medium including computer program instructions that, when executed, cause a computer to implement any of the methods described earlier.

While the disclosed technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of pre-calculation, per object, of object feature bin values for identifying close matches between objects that have numerous weighted features, the method including:
   during min-hashing of an expanded set of weighted features into a predetermined number of feature bins, circularly smearing a feature that qualifies to be inserted by min-hashing into a particular feature bin across successive feature bins,
   using a processor and memory coupled to the processor, the memory holding objects, sets of weighted features of the objects, and values placed in the feature bins by min-hashing,
   for initial weighted features of an object and a predetermined number of the feature bins used to receive the values produced by the min-hashing of the weighted features, as part of calculating an estimated Jaccard similarity index among objects:
      scaling initial weights to produce scaled-weighted features, using scaling factors automatically selected based on a sum of the initial weights divided by a number of features in a feature set, applying two or more of the selected scaling factors to scale the initial weights for min-hashing into one set of feature bins per scaling factor;
      expanding the scaled-weighted features into two or more expanded sets of weighted features of the object, wherein each expanded set includes at least as many weighted features as the predetermined number of feature bins;
      wherein expanding a particular scaled-weighted feature produces multiple instances of feature samples in proportion to respective scaled weight of the particular scaled-weighted feature; and
      min-hashing the expanded sets, with circularly smearing the incremented fractional part of a min-hashed value under consideration, so that the incremented fractional part of the min-hashed value is considered as a candidate to be inserted into at least one successive bin after insertion into an initial min-hash selected bin; and
   saving completed sets of the feature bins for each scaling of weights of the object together with a scaling factor or sum of feature weights for use in comparing sampled features of the object with sampled features of other objects by calculating an estimated Jaccard similarity index.

2. The method of claim 1, wherein each expanded set includes not more than four times as many weighted features as the predetermined number of feature bins.

3. The method of claim 1, wherein each expanded set includes one to eight times as many weighted features as the predetermined number of feature bins.

4. The method of claim 1, wherein the two or more selected scaling factors are successive powers of two.

5. The method of claim 1, further including applying three selected scaling factors and saving three completed sets of the feature bins.

6. The method of claim 1, further including applying four selected scaling factors and saving four completed sets of the feature bins.

7. The method of claim 1, further including, for a first and second object, each having a completed set of feature bins: calculating the estimated Jaccard similarity index based on a count of matches of the values in the feature bins saved for the first object with the values in the feature bins saved for the second object.

8. The method of claim 1, further including, for a first and second object, each having a completed set of feature bins: calculating the estimated Jaccard similarity index based on a comparison of the values in selected feature bins saved for the first object with the values in the feature bins saved for the second object, wherein the selected feature bins for the first and second object have matching scaling factors.

9. The method of claim 1, wherein expanding a particular scaled-weighted feature further includes applying randomized rounding to calculate a floor or ceiling integer from a scaled weight of the scaled-weighted feature and using the floor or ceiling integer to determine how many samples of the particular scaled-weighted feature to include in a particular expanded set of weighted features of the object.

10. The method of claim 1, further including, during the min-hashing, hashing a combination of the feature value of the feature and a sequence number for the samples of the particular scaled-weighted feature.

11. A device for pre-calculation, per object, of object feature bin values for identifying close matches between objects that have numerous weighted features, the device including:
- a processor, memory coupled to the processor, the memory holding objects, sets of weighted features of the objects, and values placed in the feature bins by min-hashing, and computer instructions loaded into the memory that, when executed, cause the processor to implement the method of claim 1.

12. The device of claim 11, wherein each expanded set includes 1 to 8 times as many weighted features as the predetermined number of feature bins.

13. The device of claim 11, further including, during the min-hashing, hashing a combination of the feature value of the feature and a sequence number for the samples of the particular scaled-weighted feature.

14. A tangible non-transitory computer readable storage medium that stores program instructions that, when executed, cause a computer to implement a method for pre-calculation, per object, of object feature bin values for identifying close matches between objects that have numerous weighted features, the method including:
- during min-hashing of an expanded set of weighted features into a predetermined number of feature bins, circularly smearing a feature that qualifies to be inserted by min-hashing into a particular feature bin across successive feature bins,
- using a processor and memory coupled to the processor, the memory holding objects, sets of weighted features of the objects, and values placed in the feature bins by min-hashing,
- for initial weighted features of an object and a predetermined number of the feature bins used to receive the values produced by the min-hashing of the weighted features, as part of calculating an estimated Jaccard similarity index among objects:
  - scaling initial weights to produce scaled-weighted features, using scaling factors automatically selected based on a sum of the initial weights divided by a number of features in a feature set, applying two or more of the selected scaling factors to scale the initial weights for min-hashing into one set of feature bins per scaling factor;
  - expanding the scaled-weighted features into two or more expanded sets of weighted features of the object, wherein each expanded set includes at least as many weighted features as the predetermined number of feature bins;
  - wherein expanding a particular scaled-weighted feature produces multiple instances of feature samples in proportion to respective scaled weight of the particular scaled-weighted feature; and
  - min-hashing the expanded sets, with circularly smearing the incremented fractional part of a min-hashed value under consideration, so that the incremented fractional part of the min-hashed value is considered as a candidate to be inserted into at least one successive bin after insertion into an initial min-hash selected bin; and
- saving completed sets of the feature bins for each scaling of weights of the object together with a scaling factor or sum of feature weights for use in comparing sampled features of the object with sampled features of other objects by calculating an estimated Jaccard similarity index.

15. The tangible non-transitory computer readable storage medium of claim 14, wherein each expanded set includes not more than four times as many weighted features as the predetermined number of feature bins.

16. The tangible non-transitory computer readable storage medium of claim 14, further including applying three selected scaling factors and saving three completed sets of the feature bins.

17. The tangible non-transitory computer readable storage medium of claim 14, further including, during the min-hashing, hashing a combination of the feature value of the feature and a sequence number for the samples of the particular scaled-weighted feature.

18. A method of pre-calculation, per object, of object feature bin values for identifying close matches between objects that have numerous weighted features, the method including:
- during min-hashing of a down-scaled set of weighted features into a predetermined number of feature bins, circularly smearing a feature that qualifies to be inserted by min-hashing into a particular feature bin across successive feature bins,
- using a processor and memory coupled to the processor, the memory holding objects, sets of weighted features of the objects, and values placed in the feature bins by min-hashing,
- for initial weighted features of an object and a predetermined number of the feature bins used to receive the values produced by the min-hashing of the weighted features, as part of calculating an estimated Jaccard similarity index among objects:
  - scaling initial weights to produce scaled-weighted features, using scaling factors automatically selected based on a sum of the initial weights divided by a number of features in a feature set, applying two or more of the selected scaling factors to scale the initial weights for min-hashing into one set of feature bins per scaling factor;
  - expanding the scaled-weighted features into two or more expanded sets of weighted features of the object, wherein each expanded set includes at least as many weighted features as the predetermined number of feature bins;
  - wherein expanding a particular scale-weighted feature produces multiple instances of feature samples in proportion to respective scaled weight of the particular scale-weighted features; and
  - applying randomized rounding selection to the scaled-weighted features to select contracted sets of weighted features of the object, wherein each contracted set includes one to eight times as many weighted features as the predetermined number of feature bins;
  - min-hashing the expanded sets, with circularly smearing the incremented fractional part of a min-hashed value under consideration, so that the incremented fractional part of the min-hashed value is considered as a candidate to be inserted into at least one successive bin after insertion into an initial min-hash selected bin; and
- saving completed sets of the feature bins for each scaling of weights of the object together with a scaling factor or sum of feature weights for use in comparing sampled features of the object with sampled features of other objects by calculating an estimated Jaccard similarity index.

19. The method of claim 18, wherein each expanded set includes not more than five times as many weighted features as the predetermined number of feature bins.

20. The method of claim 18, further including applying four selected scaling factors and saving four completed sets of the feature bins.

21. The method of claim 18, further including, for a first and second object, each object having a completed set of feature bins:
calculating the estimated Jaccard similarity index based on a comparison of the values in selected feature bins saved for the first object with the values in the feature bins saved for the second object, wherein the selected feature bins for the first and second object have matching scaling factors.

22. The method of claim 18, wherein expanding a particular scaled-weighted feature further includes applying randomized rounding to calculate a floor or ceiling integer from a scaled weight of the scaled-weighted feature and using the floor or ceiling integer to determine how many samples of the particular scaled-weighted feature to include in a particular expanded set of weighted features of the object.

23. A device for pre-calculation, per object, of object feature bin values for identifying close matches between objects that have numerous weighted features, the device including:
a processor, memory coupled to the processor, the memory holding objects, sets of weighted features of the objects, and values placed in the feature bins by min-hashing, and computer instructions loaded into the memory that, when executed, cause the processor to implement the method of claim 18.

24. A tangible non-transitory computer readable storage medium that stores program instructions that, when executed, cause a computer to implement a method for pre-calculation, per object, of object feature bin values for identifying close matches between objects that have numerous weighted features, the method including:
during min-hashing of a down-scaled set of weighted features into a predetermined number of feature bins, circularly smearing a feature that qualifies to be inserted by min-hashing into a particular feature bin across successive feature bins,
using a processor and memory coupled to the processor, the memory holding objects, sets of weighted features of the objects, and values placed in the feature bins by min-hashing,
for initial weighted features of an object and a predetermined number of the feature bins used to receive the values produced by the min-hashing of the weighted features, as part of calculating an estimated Jaccard similarity index among objects:
scaling initial weights to produce scaled-weighted features, using scaling factors automatically selected based on a sum of the initial weights divided by a number of features in a feature set, applying two or more of the selected scaling factors to scale the initial weights for min-hashing into one set of feature bins per scaling factor;
expanding the scaled-weighted features into two or more expanded sets of weighted features of the object, wherein each expanded set includes at least as many weighted features as the predetermined number of feature bins;
wherein expanding a particular scaled-weighted feature produces multiple instances of feature samples in proportion to respective scaled weight of the particular scaled-weighted feature; and
applying randomized rounding selection to the scaled-weighted features to select contracted sets of weighted features of the object, wherein each contracted set includes at least as many weighted features as the predetermined number of feature bins;
min-hashing the expanded sets, with circularly smearing the incremented fractional part of a min-hashed value under consideration, so that the incremented fractional part of the min-hashed value is considered as a candidate to be inserted into at least one successive bin after insertion into an initial min-hash selected bin; and
saving completed sets of the feature bins for each scaling of weights of the object together with a scaling factor or sum of feature weights for use in comparing sampled features of the object with sampled features of other objects by calculating an estimated Jaccard similarity index.

25. The tangible non-transitory computer readable storage medium of claim 24, further including, for a first and second object, each object having a completed set of feature bins:
calculating the estimated Jaccard similarity index based on a comparison of the values in selected feature bins saved for the first object with the values in the feature bins saved for the second object, wherein the selected feature bins for the first and second object have matching scaling factors.

* * * * *